No. 893,411. PATENTED JULY 14, 1908.
E. M. WOLFENDEN & H. WOLFENDEN.
ROLLER BEARING HUB.
APPLICATION FILED JULY 6, 1907.
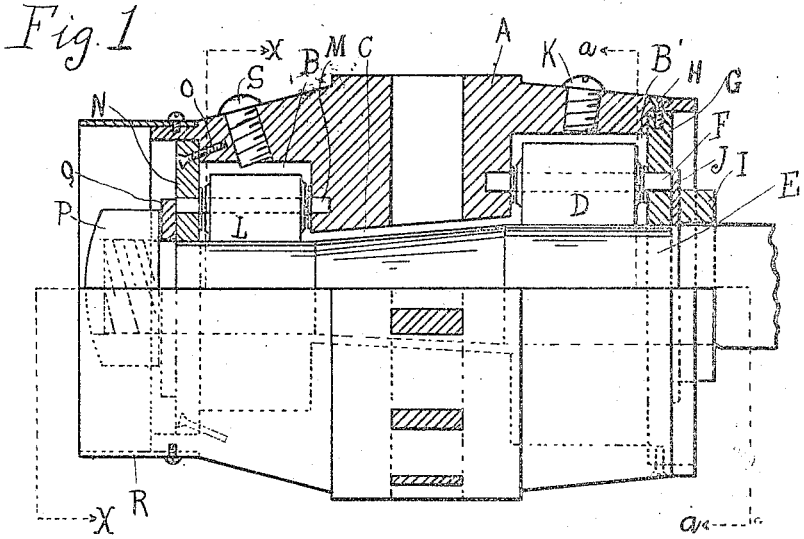
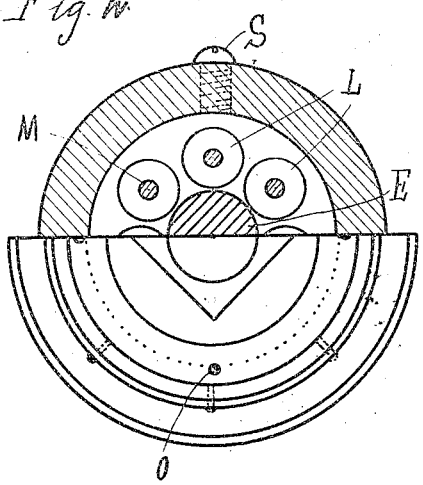
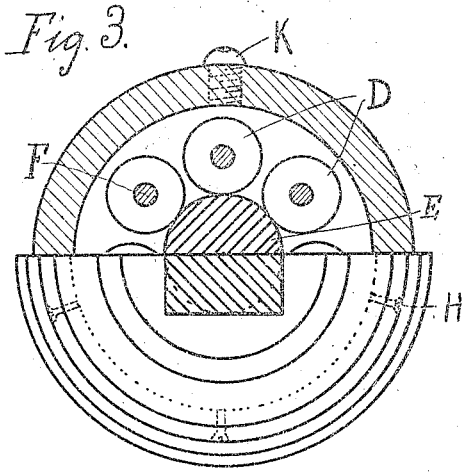
WITNESSES
S. M. Gallagher
S. O. Williamson
INVENTORS.
Edward M Wolfenden
Howard Wolfenden
BY
ATTORNEY

UNITED STATES PATENT OFFICE.

EDWARD M. WOLFENDEN AND HOWARD WOLFENDEN, OF PHILADELPHIA, PENNSYLVANIA.

ROLLER-BEARING HUB.

No. 893,411.  Specification of Letters Patent.  Patented July 14, 1908.

Application filed July 6, 1907. Serial No. 382,463.

*To all whom it may concern:*

Be it known that we, EDWARD M. WOLFENDEN and HOWARD WOLFENDEN, citizens of the United States, residing at Philadelphia, county of Philadelphia, and State of Pennsylvania, have invented a certain new and useful Improvement in Roller-Bearing Hubs, of which the following is a specification.

Our invention relates to a new and useful improvement in antifriction or roller bearing hubs, and has for its object the construction of a solid hub in which are placed rolls which revolve on spindles or journals upon an axle of two diameters, or straight, as best suits the requirements of different type wheels, thereby constructing a hub of the greatest strength with the least possible amount of friction.

With these ends in view, this invention consists in the details of construction and combination of elements hereinafter set forth and then specifically designated by the claims.

In order that those skilled in the art to which this invention appertains may understand how to make and use the same we will describe its construction in detail, referring by letter to the accompanying drawing forming a part of this specification in which,—

Figure 1, is a side view of the hub, a portion being sectioned so as to clearly show the position of the axle and the rolls therein. Fig. 2, a section at the line X—X of Fig. 1 looking in the direction of the arrow, and Fig. 3, a section at the line a—a looking in the opposite direction.

In carrying out our invention as here embodied, A represents the hub which may be of any suitable material preferably metal, and within this hub are formed the cylindrical recesses B and B', the latter of larger diameter than the former. These two recesses are connected by a tapered bore C.

D is a series of rolls located in the recess B' and adapted to travel upon the largest diameter of the axle E, and these rolls are journaled upon the spindles F, the inner ends of which fit into suitable holes in the hub while the outer ends are set in the plate G, the latter being held rigidly in place in any suitable manner here shown as by the screws H.

I is the usual collar upon the axle and J is a washer of a diameter to extend beyond and engage spindles F at the rear of the hub, said washer being fitted between this collar and the plate G. When the axle is in place within the hub the recess B' will be almost entirely inclosed and in order that the rolls may be lubricated we form a threaded opening from the outer diameter of the hub to the recess and close the same with a threaded plug or screw K.

The recess B has located therein the rolls L which are journaled upon the spindles M, the inner ends of which are set stationary in holes formed in the hub while their outer ends are tightly fitted in holes formed in the plate N, the latter partially inclosing the recess but having a hole through the center thereof for the passage of the smaller diameter of the axle, and this plate is held rigidly in position in any suitable manner here shown by the screws O.

The outer end of the axle is threaded for the reception of the nut P between which and the plate N is interposed a washer Q of a diameter to extend beyond and engage spindles M, and around the outer rim of the hub is secured the band R, or if desired, this may be cast or otherwise formed with the hub.

The recess B has a threaded hole leading thereto which is normally kept closed by the threaded plug or screw S so as to facilitate the lubricating of the rolls L.

From the above description it will be seen that in an axle having two diameters and a tapered portion connecting the same, the hub will fit upon this axle and the rolls D travel upon the surface of large diameter while the rolls L travel upon that of small diameter, and as the recesses in which these rolls are journaled are inclosed, oil or other lubricant placed within these recesses will continually lubricate these rolls as they travel upon the axle and all dust and dirt will be excluded from the journals.

By making the axle of two diameters the general effect of a tapered axle is had, thus providing for the greatest strain to fall upon the thickest portion of the spindle of the axle which is essential in vehicle use.

Having thus fully described our invention, what we claim as new and useful, is—

In combination with an axle and a hub thereon having a pair of separated recesses therein, a series of rolls in each recess, a spindle for each roll, one end of each spindle being received in an aperture provided therefor in the inner end walls of said recesses, each of the ends of the hub being formed with an annular recess which forms a shoulder at the outer ends of said first named recesses, an annular perforated plate snugly fitting in each of said second named recesses and bearing against said shoulders, screws secured to said plates and the hub, the other ends of said spindles being received in the perforation provided therefor in said plates, said axle having its outer end threaded and having a collar on its inner end, a washer of a diameter to extend beyond and engage the spindles at the rear of the hub interposed between the plate and the rear of the hub and said collar of the axle, a second washer of a diameter to extend beyond and engage the spindles at the front of the hub and a nut on the threaded part of the axle to engage the outer face of the second washer.

In testimony whereof, we have hereunto affixed our signatures in the presence of two subscribing witnesses.

EDWARD M. WOLFENDEN.
HOWARD WOLFENDEN.

Witnesses:
JOHN W. BRENNER,
CHESTER OSBORNE.